United States Patent [19]
Pander

[11] 3,898,280
[45] Aug. 5, 1975

[54] MANUFACTURE OF CARBOXYLIC ACID AMIDES

[75] Inventor: Hans Joachim Pander, Roederesheim-Gronau, Germany

[73] Assignee: Badische Anilin- & Soda-Fabrik Aktiengesellschaft, Ludwigshafen (Rhine), Germany

[22] Filed: July 20, 1973

[21] Appl. No.: 381,169

[30] Foreign Application Priority Data
July 22, 1972 Germany............................ 2236040

[52] U.S. Cl....... 260/561 R; 260/558 R; 260/557 R; 260/559 R
[51] Int. Cl............................................ C07c 103/08
[58] Field of Search............................ 260/557–562

[56] References Cited
UNITED STATES PATENTS
2,628,217  2/1953  Magat................................ 260/558

*Primary Examiner*—Harry I. Moatz
*Attorney, Agent, or Firm*—Johnston, Keil, Thompson & Shurtleff

[57] ABSTRACT

An improved process for the manufacture of N-monosubstituted carboxylic acid amides in which the substituent is bonded to the nitrogen via a non-aromatic tertiary carbon atom, by reaction of tertiary alcohols or olefinically unsaturated compounds in which one carbon atom forming part of the olefinic double bond is a tertiary carbon atom, with nitriles or hydrogen cyanide in the presence of acid condensation agents at temperatures of 0° to 130°C, the improvement being that formic acid is used as the condensation agent. The carboxylic acid amides manufactured in this way can be used for conversion to amines which are less readily obtainable and which serve as starting substances for plant protection agents.

10 Claims, No Drawings

MANUFACTURE OF CARBOXYLIC ACID AMIDES

This invention relates to an improved process for the manufacture of N-monosubstituted carboxylic acid amides in which the substituent is bonded to the nitrogen via a non-aromatic tertiary carbon atom.

Houben-Weyl, Methoden der organischen Chemie, discloses, in volume 11/1, pages 994 to 1,000, the manufacture of N-substituted carboxylic acid amides by reaction of alcohols or olefins with nitriles in the presence of acid condensation agents. In general, sulfuric acid is used as the condensation agent. In Organic Reactions, volume 17, pages 215 to 324, sulfuric acid is again recommended as being the most effective condensation agent for the Ritter reaction. However, after completion of the reaction the sulfuric acid cannot be recovered and this necessarily leads to the production of sodium sulfate, the amount of which is several times the amount by weight of the carboxylic acid amide obtained. Further, German Offenlegungsschrift 1,543,317 states that liquid hydrogen fluoride can be used as the condensation agent for the amidation of alcohols with nitriles. However, hydrogen fluoride is a very corrosive medium and demands special technical precautions. According to another process, described in U.S. Pat. No. 2,628,217, N-substituted carboxylic acid amides are obtained when tert-butyl chloride is reacted with nitriles in the presence of 90 per cent strength formic acid as the condensation agent. However, even if reaction times of 5 to 15 hours are employed, the N-substituted amides in question are only obtained in yields of 10 to 39%.

It is an object of this invention to provide a process which gives high yields. Another object of this invention is to provide a process in which corrosion is kept within industrially acceptable limits. Yet another object of the invention is to provide a process in which no waste materials are formed which pass into the effluent system.

In accordance with the present invention, these and other objects and advantages are achieved in an improved process for the manufacture of N-monosubstituted carboxylic acid amides in which the substituent is bonded to the nitrogen via a Non-aromatic tertiary carbon atom, by the reaction of tertiary alcohols or olefinically unsaturated compounds in which one carbon atom which forms part of the olefinic double bond is a tertiary carbon atom, with nitriles or tertiary hydrogen atoms in the presence of acid condensation agents at temperatures of 0° to 130°C, the improvement being that formic acid is used as the condensation agent.

Tertiary alcohols which are preferred for the reaction have the formula I

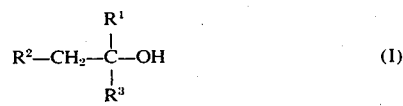

(I)

in which $R^1$ and $R^3$ are identical or different and each is an aliphatic radical of 1 to 20 carbon atoms, $R^2$ is hydrogen or an aliphatic radical of 1 to 19 carbon atoms and $R^1$ and $R^2$ together with the carbon atoms to which they are attached may be a carbocyclic ring with 5 to 12 carbon atoms which may also be part of a bicyclic or polycyclic system. The aliphatic radicals $R^1$, $R^2$ and $R^3$ may contain hetero atoms, such as oxygen, sulfur or nitrogen. Particularly preferred tertiary alcohols of the formula I are those in which $R^1$ and $R^3$ are identical or different and each is alkyl of 1 to 12 carbon atoms, $R^2$ is hydrogen or alkyl of 1 to 12 carbon atoms and $R^1$ and $R^2$ together with the carbon atoms to which they are attached may be a carbocyclic ring with 5 to 8 carbon atoms, which may also be part of a bicyclic system. Examples of suitable tertiary alcohols are tert-butanol, 2-methylbutanol-2, 3-methylpentanol-3, 3-ethylpentanol-3, 2-ethylbutanol-2, 3,7-dimethyloctanol-3, 1-methylcyclopentanol, 1-ethylcyclopentanol, 1-ethylcyclohexanol, 1-ethylnorbornanol-1, 1-ethylcyclooctanol, 2,4-dimethyl-3-ethylpentanol-3, 2,3-dimethylpentanol-3, 2,2,3-trimethylpentanol-3 and 3-methyldodecanol-3.

Preferred olefins are those of the formula II

(II)

in which $R^1$, $R^2$ and $R^3$ have the meaning indicated for the formula I. Examples of suitable olefins are isobutylene, 2-methylbutene-1, 2-methylbutene-2, 2-methylpentene-2, 2,4,4-trimethylpentene-1, 2,4,4-trimethylpentene-2, 2-ethylhexene-1, 2-methylnorbornene.

In general, tertiary alcohols are preferred for the reaction.

Preferred nitriles (cyano compounds) which are used for the reaction are those of the general formula III

(III)

in which $R^4$ is a hydrogen atom or a saturated or unsaturated aliphatic, cycloaliphatic, araliphatic or aromatic radical of up to 12 carbon atoms.

The radicals mentioned may bear 1 or 2 halogen atoms or nitro groups or alkoxy groups of 1 to 4 carbon atoms as substituents. In particularly preferred nitriles of the formula III, $R^4$ is hydrogen or alkyl of 1 to 6 carbon atoms. Hydrogen cyanide has in this respect acquired particular industrial importance. Examples of suitable nitriles are acetonitrile, propionitrile, butyronitrile, isobutyronitrile, chloroacetonitrile, benzonitrile, acrylonitrile, chlorobenzonitrile, 2,6-dichlorobenzonitrile and benzyl cyanide. It is obvious that the preferred starting substances of the formulae I, II and III give the preferred carboxylic acid amides of the formula

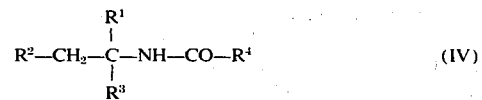

(IV)

in which $R^1$, $R^2$, $R^3$ and $R^4$ have the abovementioned meanings.

In general, 1 to 30 moles of nitrile are employed per mole of tertiary alcohol or olefin. It has proved particularly advantageous to use 1.1 to 10 moles of nitrile per mole of tertiary alcohol or olefin.

The reaction is carried out in the presence of formic acid. It is advantageous to use formic acid of at least 90 per cent strength by weight. It is particularly advantageous if the formic acid used is of at least 95 per cent strength by weight. Preferably, 1 to 30 moles, especially 2 to 15 moles, of formic acid are used per mole of tertiary alcohol or olefin.

The reaction is carried out at temperatures of 0° to 130°C. Particularly good results are achieved if temperatures of 40° to 120°C are used. The reaction is generally carried out at atmospheric or superatmospheric pressure, for example at up to 30 atm. pressure.

Solvents may also be used for the reaction. Examples of suitable solvents are hydrocarbons, such as cyclohexane, and ethers, such as dioxan or diethyl ether. If a solvent is not used, the nitriles used in excess or the formic acid used in excess serve as the solvent.

An example of how to carry out the process according to the invention is to mix the tertiary alcohols or olefins, the nitriles and formic acid in the ratio indicated and to heat the mixture, whilst stirring, to the temperatures described, advantageously under reflux. If one of the reactants is in the gaseous state at the temperatures used or has a very high vapor pressure at the temperatures used, it is advisable to carry out the reaction at superatmospheric pressure. In general, the reaction is complete after 1 to 15 hours. The reaction may be carried out batchwise or continuously, for example in a cascade of stirred vessels consisting of 2 to 4 stirred vessels, or in a mixing cycle. The excess reactants are advantageously recovered from the resulting reaction mixture by distillation. They can be returned to the reaction. The carboxylic acid amides obtained can be used for further conversions in the form in which they are obtained or can be obtained in the desired purity by suitable known purification measures, such as distillation, crystallization or sublimation.

The carboxylic acid amides manufactured according to the process of the invention are suitable for the manufacture of less easily accessible amines by saponification. The amines obtained are important starting substances for the manufacture of plant protection agents (compare Example 13).

The parts referred to in the examples which follow are parts by weight; they bear the same relation to parts by volume as the kilogram to the liter.

EXAMPLE 1

A mixture of 552 parts of anhydrous formic acid, 58 parts of anhydrous hydrocyanic acid and 74 parts of tert-butanol is heated at 54°C for 15 hours in a stirred vessel provided with a thermometer and a reflux condenser which can be cooled with brine. After completion of the reaction, 26 parts of hydrocyanic acid are recovered by distillation through a short column. Thereafter, 503 parts of formic acid are distilled off in a thin film evaporator at 50 mm Hg. The colorless residue obtained consists of 99 parts (95% of theory) of tert-butylformamide which still contains 3 parts of free formic acid.

For conversion into the corresponding amine, the tert-butylformamide is mixed with 320 parts of 25 per cent strength aqueous sodium hydroxide solution and the mixture is heated under reflux. The amine liberated thereby is distilled off through a packed column. 69 parts of anhydrous tert-butylamine having a boiling point of 43° to 45°C are obtained, corresponding to a yield of 94.5% of theory based on tert-butanol employed.

EXAMPLE 2

A mixture of 552 parts of 100 per cent strength formic acid, 82 parts of acetonitrile and 102 parts of 3-methylpentanol-3 is heated under reflux in a stirred vessel for 8 hours, the temperature rising from 65° to 75°C. After separating off the unreacted acetonitrile and the formic acid employed as the condensation agent, distillation in a high vacuum gives 130 parts of N-(3-methylpentyl)-3-acetamide having a boiling point of 64° to 65°C at 0.1 mm Hg. This corresponds to a yield of 91% of theory based on 3-methylpentanol-3 employed.

EXAMPLE 3

A mixture of 1,150 parts of 100 per cent strength formic acid and 405 parts of anhydrous hydrocyanic acid is warmed under reflux in a stirred vessel provided with a thermometer, a reflux condenser which can be cooled with brine, and a vessel from which reagent can be added. 540 parts of 2-methyl-2-norbornene are introduced in the course of 75 minutes whilst refluxing is continuing, without external heating. The reaction temperature rises from 35° to 40°C. The reaction is allowed to continue for a further 4½ hours at the reflux temperature. The final temperature is 52°C. The excess hydrocyanic acid and the formic acid employed as the condensation agent are distilled off under the vacuum from a water jet pump. There is obtained 670 parts (85% of theory) of 2-methyl-2-formamide-norbornane which is light yellow in color and still contains 3% of free formic acid.

To prepare the free amine, the 2-methyl-2-formamide-norbornane is mixed with 960 parts of 25 per cent strength aqueous sodium hydroxide solution. The mixture is heated and at the same time the amine liberated is steam-distilled. The organic phase of the distillate is taken up in benzene, dried azeotropically and fractionally distilled. After the solvent has been removed, 530 parts of 2-methyl-norbornyl-2-amine having a boiling point of 114° to 115°C at 150 mm Hg are obtained. On cooling, the distillate solidifies (melting point 69° to 70°C); the amine number is 449 (calculated: 448). The yield is 85% of theory based on 2-methyl-2-norbornene employed.

EXAMPLE 4

A mixture of 1,380 parts of 100 per cent strength formic acid and 270 parts of anhydrous hydrocyanic acid is heated under reflux in a stirred vessel provided with a reflux condenser which can be cooled with brine, a thermometer and a vessel for adding reactant. 560 parts of 2-ethylhexene-1 are run in over the course of one hour whilst the mixture is refluxing. The reaction mixture is warmed under reflux for a further 9 hours, the reaction temperature rising to a maximum of 80°C. Excess hydrocyanic acid and the formic acid employed as the condensation agent are distilled off in a film evaporator. The crude product which remains and which still contains traces of formic acid is taken up in benzene and treated with a little aqueous bicarbonate solution, and after separating off the aqueous phase the organic phase is fractionally distilled. After the solvent has been removed, 715 parts of 3-formamido-3-methylheptane boiling at 94° to 96°C at 0.1 mm Hg are obtained; this corresponds to a yield of 91% of theory based on 2-ethylhexene-1 employed.

EXAMPLE 5

A mixture of 184 parts of formic acid, 34 parts of 2,6- dichlorobenzonitrile and 22 parts of 2-methyl-2-norbornene is heated under reflux for 7 hours in a stirred vessel. The crude product which crystallizes out after cooling is separated from the condensation agent by suction filtration and is washed with water until the latter reacts neutral and recrystallized from 200 parts of methanol. After drying in vacuo, 43 parts of N-(2-methylnorbornyl)-2,6-dichlorobenzamide melting at 215° to 218°C are obtained; this corresponds to a yield of 71% of theory, based on 2-methyl-2-norbornene.

EXAMPLE 6

A mixture of 276 parts of formic acid, 91 parts of chloroacetonitrile and 74 parts of tert-butanol is heated under reflux for 5 hours whilst stirring, 9 parts of isobutylene being condensed in a condensation vessel which is connected to the apparatus and is cooled with $CO_2$. The formic acid employed as the condensation agent is distilled from the reaction mixture in vacuo. The crystalline residue which is left is recrystallized from 500 parts of cyclohexane.

105 parts of colorless needles of melting point 81° to 82°C are obtained. The Cl content of the crystals is 23.5% (theory: 23.75%). The yield of pure N-tert-butyl-chloroacetamide is 84% of theory, based on tert-butanol converted. A further 12 parts of N-tert-butyl-chloroacetamide, containing 22.9% of chlorine, can be isolated by concentrating the mother liquor.

EXAMPLE 7

552 parts of anhydrous formic acid, 113 parts of benzonitrile and 74 parts of tert-butanol are heated under reflux for 3 hours, whilst stirring, the reaction temperature rising from 80° to 106°C. After completion of the reaction, the formic acid is distilled off in vacuo. 500 parts of water is added to the residue. The reaction product which crystallizes out is filtered off, washed with water and dried in vacuo at 80° to 90°C. 143 parts of N-tert-butylbenzamide having a melting point of 129° to 130°C are obtained, corresponding to a yield of 81% of theory based on tert-butanol employed.

EXAMPLE 8

552 parts of anhydrous formic acid, 103 parts of isobutyronitrile and 88 parts of 2-methylbutanol-2 are heated under reflux for 16 hours. Thereafter the reaction mixture is fractionally distilled in vacuo. After removing the excess isobutyronitrile and the formic acid employed as the condensation agent, 134 parts of N-(2-methylbutyl)-isobutyric acid amide boiling at 108° to 111°C at 18 mm Hg are obtained; this corresponds to a yield of 85% of theory based on 2-methylbutanol-2 employed. The distillate crystallizes on cooling. Its melting point is 61° to 63°C.

EXAMPLE 9

A mixture of 460 parts of anhydrous formic acid, 58 parts of anhydrous hydrocyanic acid and 74 parts of tert-butanol is pumped in the course of 5 minutes into a stainless steel stirred autoclave which has been heated to 100°C. The temperature is maintained at 100° to 105°C for 1 hour and the reaction mixture is then forced through an ascending tube into a receiver cooled with ice. Excess hydrocyanic acid and the formic acid employed as the condensation agent are then distilled off in Vacuo into a receiver cooled with $CO_2$.

The residue obtained consists of 102 parts of crude tert-butylformamide. To determine the yield, an aliquot part of the crude formamide is saponified with excess 25 per cent strength sodium hydroxide solution and the tert-butylamine distilled off is determined titrimetrically. The determination indicated that the crude formamide was 94% pure; this corresponds to a yield of 95% of theory based on tert-butanol employed.

EXAMPLE 10

A mixture of 276 parts of formic acid, 106 parts of acrylonitrile and 112 parts of 2,4,4-trimethylpentene-(2) is heated under reflux for 8 hours in a stirred flask, with vigorous stirring. After completion of the reaction, the excess acrylonitrile and the formic acid employed as the condensation agent are distilled off at 150 mm Hg. The residue which crystallizes and which still contains a little formic acid is dissolved in 200 parts of benzene and after adding 200 parts of water the solution is washed with sodium bicarbonate until neutral. The organic phase is separated off, dried over sodium sulfate and fractionally distilled. After the solvent has been removed, 133 parts of N-(2,4,4-trimethylpentyl)-2-acrylamide boiling at 67° to 69°C at 0.1 mm Hg are obtained; this corresponds to a yield of 73% of theory, based on 2,4,4-trimethylpentene-(2) employed. The distillate solidifies on cooling; the melting point is 59° to 61°C.

Analysis: calculated for $C_{11}H_{21}NO$: 72.2% C; 11.5% H; 7.65% N; 8.75% O. found 72.2% C; 11.5% H; 7.7% N; 9.1% O.

EXAMPLE 11

420 parts of 2-methylbutene-2 are run over the course of 2 hours into a mixture of 1,656 parts of 100 per cent strength formic acid and 324 parts of anhydrous hydrocyanic acid, whilst stirring, the heat of reaction liberated being removed by reflux condensation. The reaction mixture is heated under reflux for a further 10 hours. At the end of the reaction time, the temperature is 73°C. Excess hydrocyanic acid and formic acid are distilled off in vacuo. There is obtained 635 parts of colorless N-(2-methylbutyl)-2-formamide which still contains 2% of formic acid (yield: 90% of theory).

To prepare the free amine, 1,280 parts of 25 per cent strength aqueous sodium hydroxide solution are added to the residue, the mixture is heated under reflux whilst stirring and at the same time the amine is distilled off through a packed column with 5 to 10 theoretical plates. 485 parts of 2-methylbutyl-2-amine boiling at 75° to 76°C and containing 4.3% of water are obtained; this corresponds to a yield of 89% of theory based on 2-methylbutene-2 employed.

EXAMPLE 12

A mixture of 552 parts of 100 per cent strength formic acid, 165 parts of propionitrile and 176 parts of 2methylbutanol-2 is heated under reflux for 10 hours, whilst stirring, the reaction temperature rising from 45° to 70°C. After completion of the reaction, the reaction mixture is fractionally distilled. After the formic acid and the excess propionitrile have been removed, 228 parts of N-(2-methylbutyl)-2-propionamide boiling at 109° to 111°C at 17 mm Hg are obtained; this corresponds to a yield of 80% of theory based on 2-methylbutanol-2 employed.

Analysis: calculated for $C_8H_{17}NO$: 67.1% C; 11.9% H; 9.8% N; 11.2% O. found: 66.8% C; 12.0% H; 9.8% N; 11.8% O.

EXAMPLE 13

15 parts of 3,5-dichlorobenzoyl chloride dissolved in 30 parts of benzene are added in portions, at 0° to 5°C, to a mixture of 13 parts of 2-methylbutyl-2-amine which has been prepared as described in Example 11 and 80 parts of benzene, whilst stirring and externally cooling the mixture. The reaction is allowed to continue for a further hour and the crystals formed are filtered off and washed with water until the latter shows no reaction for chlorine. After drying in vacuo at 60°C, the crystalline substance is recrystallized from a mixture of petroleum ether and cyclohexane. 14 parts of N-(2-methylbutyl)-2-dichlorobenzamide melting at 100° to 101°C are obtained; this corresponds to a yield of 75% of theory based on 3,5-dichlorobenzoyl chloride employed.

Analysis: calculated for $C_{12}H_{15}Cl_2NO$: 55.4% C; 5.77% H; 5.38% N; 27.3% Cl. found 55.6% C; 6.1% H; 5.40% N; 27.5% Cl.

The product obtained displays herbicidal properties.

I claim:

1. An improved process for the manufacture of a carboxylic acid amide of the formula

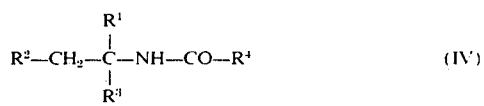

(IV)

in which $R^1$ and $R^3$ are identical or different and each is an aliphatic radical of 1 to 20 carbon atoms, $R^2$ is hydrogen or an aliphatic radical of 1 to 19 carbon atoms, the aliphatic radicals $R^1$, $R^2$ and $R^3$ optionally bearing as substituents 1–2 halogen atoms, 1–2 nitro groups or 1–2 alkoxy groups of 1–4 carbon atoms, or $R^1$ and $R^2$ together with the carbon atoms to which they are attached form a saturated mono-, bi- or poly-carbocyclic ring with 5 to 12 carbon atoms, and $R^4$ is hydrogen or a saturated or unsaturated aliphatic, saturated cycloaliphatic or araliphatic radical or an aromatic radical respectively of up to 12 carbon atoms, and optionally bearing as substituents 1–2 halogen atoms, 1–2 nitro groups or 1–2 alkoxy groups of 1–4 carbon atoms, by reaction of a tertiary alcohol of the formula

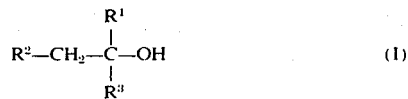

(I)

in which $R^1$, $R^2$ and $R^3$ have the abovementioned meanings, or of an olefinically unsaturated compound of the formula

(II)

in which $R^1$, $R^2$ and $R^3$ have the abovementioned meanings, with a cyano compound of the formula $$R^4 - CN$$

(III)

in which $R^4$ has the abovementioned meaning, at a mol ratio in the reaction mixture of 1 to 30 moles of said cyano compound per mole of said tertiary alcohol or said olefinically unsaturated compound in the presence of an acid condensation agent at a temperature of 0° to 130°C, the improvement being that 1 to 30 moles of formic acid of at least 90 percent strength by weight are used as the condensation agent per mole of said tertiary alcohol or said olefinically unsaturated compound.

2. A process as claimed in claim 1, wherein a tertiary alcohol of the formula (I) is used, in which $R^1$ and $R^3$ are identical or different and each is alkyl of 1 to 12 carbon atoms, $R^2$ is hydrogen or alkyl of 1 to 12 carbon atoms or $R^1$ and $R^2$ together with the carbon atoms to which they are attached form a saturated mono- or bi-carbocyclic ring with 5 to 8 carbon atoms.

3. A process as claimed in claim 1, wherein an olefinically unsaturated compound of the formula (II) is used, in which $R^1$ and $R^2$ are identical or different and each is alkyl of 1 to 12 carbon atoms, $R^2$ is hydrogen or alkyl of 1 to 12 carbon atoms or $R^1$ and $R^2$ together with the carbon atoms to which they are attached a mono-olefinically unsaturated carbocyclic radical with 5 to 8 carbon atoms.

4. A process as claimed in claim 1, wherein a cyano compound of the formula (III) in which $R^4$ is hydrogen or alkyl of 1 to 6 carbon atoms, is used.

5. A process as claimed in claim 1, wherein at least 95 per cent strength by weight formic acid is used.

6. A process as claimed in claim 1, wherein 2 to 15 moles of formic acid are used per mole of said tertiary alcohol or said olefinically unsaturated compound.

7. A process as claimed in claim 1, wherein a temperature of 40° to 120°C is maintained.

8. A process as claimed in claim 1, wherein the reaction is carried out at atmospheric pressure or superatmospheric pressure up to 30 atmospheres.

9. A process as claimed in claim 1, wherein said cyano compound is hydrogen cyanide.

10. A process as claimed in claim 1 wherein said cyano compound is acrylonitrile.

* * * * *